United States Patent [19]

Favreau et al.

[11] Patent Number: 4,499,486
[45] Date of Patent: Feb. 12, 1985

[54] DEVICE FOR CORRECTING COLOR INFORMATION SUPPLIED BY A TELEVISION CAMERA WITH A VIEW TO IMPROVING THE PERCEPTION OF PICTURES

[75] Inventors: Michel Favreau, Paris; Jean Bajon, Toulouse; Serge Soca, Paris, all of France

[73] Assignee: Thomson-CSF, Paris, France

[21] Appl. No.: 379,945

[22] Filed: May 19, 1982

[30] Foreign Application Priority Data

May 22, 1981 [FR] France .................................. 81 10253

[51] Int. Cl.³ .............................................. H04N 5/14
[52] U.S. Cl. ..................................... 358/37; 364/553; 364/554; 358/166
[58] Field of Search ........................... 358/37, 166, 27; 364/553, 554

[56] References Cited

U.S. PATENT DOCUMENTS

| | | | |
|---|---|---|---|
| 3,681,520 | 8/1972 | Schneider | 358/37 |
| 3,684,825 | 8/1972 | Dischert et al. | 358/27 |
| 3,979,555 | 9/1976 | Opittek et al. | 358/166 |
| 3,983,320 | 9/1976 | Ketcham et al. | 358/166 |
| 4,315,319 | 2/1982 | White | 364/553 |
| 4,337,514 | 6/1982 | Favreau et al. | 358/166 |
| 4,353,092 | 10/1982 | Bailey et al. | 358/166 |
| 4,365,304 | 12/1982 | Ruhman et al. | 358/166 |
| 4,394,744 | 7/1983 | Wrench, Jr. | 358/166 |

Primary Examiner—Jerry Smith
Assistant Examiner—Louis Woo
Attorney, Agent, or Firm—Cushman, Darby & Cushman

[57] ABSTRACT

The correction consists in correcting the overall luminance, while retaining the original chromaticity of the analyzed picture. For this purpose, the device according to the invention comprises a correcting circuit receiving the color signals $V_{e1}$, $V_{e2}$ and $V_{e3}$ and supplying corrected color signals, a matrixing circuit supplying the overall luminance signal $V_e$, and a control circuit calculating eight transfer parameters defining the transfer function F, which transforms the signal $V_e$ into a signal $F(V_e)$ covering the scale of luminances in accordance with an equal distribution in order to satisfy the optimum vision conditions. The control circuit processes the signal $(F(V_e)/V_e)$ and the correcting circuit supplies corrected color signals respectively corresponding to the products $V_{e1} \cdot (F(V_e)/V_e)$, $V_{e2} \cdot (F(V_e)/V_e)$ and $V_{e3} \cdot (F(V_e)/V_e)$.

8 Claims, 2 Drawing Figures

DEVICE FOR CORRECTING COLOR INFORMATION SUPPLIED BY A TELEVISION CAMERA WITH A VIEW TO IMPROVING THE PERCEPTION OF PICTURES

BACKGROUND OF THE INVENTION

The present invention relates to devices for correcting colour information supplied by a camera of a video transmission system with a view to obtaining, on reception, a picture containing the maximum of visible information.

In black and white picture transmission systems, a correction device for improving the perception of pictures is already known (U.S. Pat. No. 4,337,514 filed by the Applicant Company). The process performed by this device consists of correcting the luminance signal supplied by the camera or pickup tube of a black and white camera by means of a non-linear quadripole with variable characteristics and controlled in such a way that the histogram of the values of the corrected luminance signal has a flat form whatever the shooting conditions, which corresponds to a regular distribution of the values on the scale of said values. In its present form, this correction device does not make it possible to improve colour pictures, it only being usable in connection with the improvement of the black and white pictures.

BRIEF SUMMARY OF THE INVENTION

The present invention relates to a correction device, which makes it possible to improve the perception of colour pictures. The problem consists in correcting the overall luminance in accordance with the method used by the known device, while retaining the original chromaticity of the analyzed picture.

The present invention specifically relates to a device for correcting colour information signals of values $V_{e1}$, $V_{e2}$ and $V_{e3}$ supplied by a television camera, comprising a determination circuit having three inputs respectively receiving the three colour information signals and an output, for supplying a signal of value $V_e$ which is a function of the values of the colour information signals; a control circuit having an input coupled to the output of the determination circuit and having an output for supplying a signal of value $G(V_e) = (F(V_e)/V_e)$, in which F is a function such that the histogram of values $F(V_e)$ as a function of the values $V_e$ has a predetermined distribution chosen for improving the perception of images; and a correction circuit having three first inputs respectively receiving the three colour information signals, a second input coupled to the output of the control circuit and having three outputs constituting the outputs of the device according to the invention, for supplying three signals which are functions of the value $G(V_e)$ and of the values $V_{e1}$, $V_{e2}$, $V_{e3}$ respectively.

BRIEF DESCRIPTION OF THE DRAWINGS

The invention is described in greater detail hereinafter relative to non-limitative embodiments and the attached drawings, described below.

DETAILED DESCRIPTION OF THE PREFERRED EMBODIMENTS

In the first embodiment, the device according to the invention receives three colour information signals of values $V_{e1}$, $V_{e2}$ and $V_{e3}$, respectively constituted by three blue, green and red signals of values $E_B$, $E_V$ and $E_R$ respectively applied to the three inputs terminals 1, 2 and 3. At the output terminals 15, 16 and 17 it supplies three corrected colour information signals of values $V_{S1}$, $V_{S2}$ and $V_{S3}$. The overall luminance value is:

$$E_Y = 0.11 \cdot E_B + 0.59 \cdot E_V + 0.3 \cdot E_R$$
$$= 0.11 \cdot V_{e1} + 0.59 \cdot V_{e2} + 0.3 \cdot V_{e3}$$

The correction of the overall luminance consists of multiplying this value by a variable coefficient G:

$$E_Y \text{ corrected} = E_Y \cdot G$$

As the value $E_Y$ is a linear combination of $E_V$, $E_R$ and $E_B$ for retaining the chromaticity it is merely necessary to multiply the three values $E_V$, $E_R$ and $E_B$ by the same coefficient G. Coefficient G varies when $E_Y$ varies, because it is determined in such a way as to flatten the histogram of values $V_e$ of a signal constituted, in this embodiment, by the overall luminance signal. The correction device according to the invention supplies in this case three colour signals having as the corrected value:

$$V_{S1} = G(V_e) \cdot V_{e1} \text{ with} \qquad V_e = E_Y$$
$$V_{S2} = G(V_e) \cdot V_{e2} \qquad V_{e1} = E_B$$
$$V_{S3} = G(V_e) \cdot V_{e3} \qquad V_{e2} = E_V$$
$$V_{e3} = E_R$$

Figure 1:
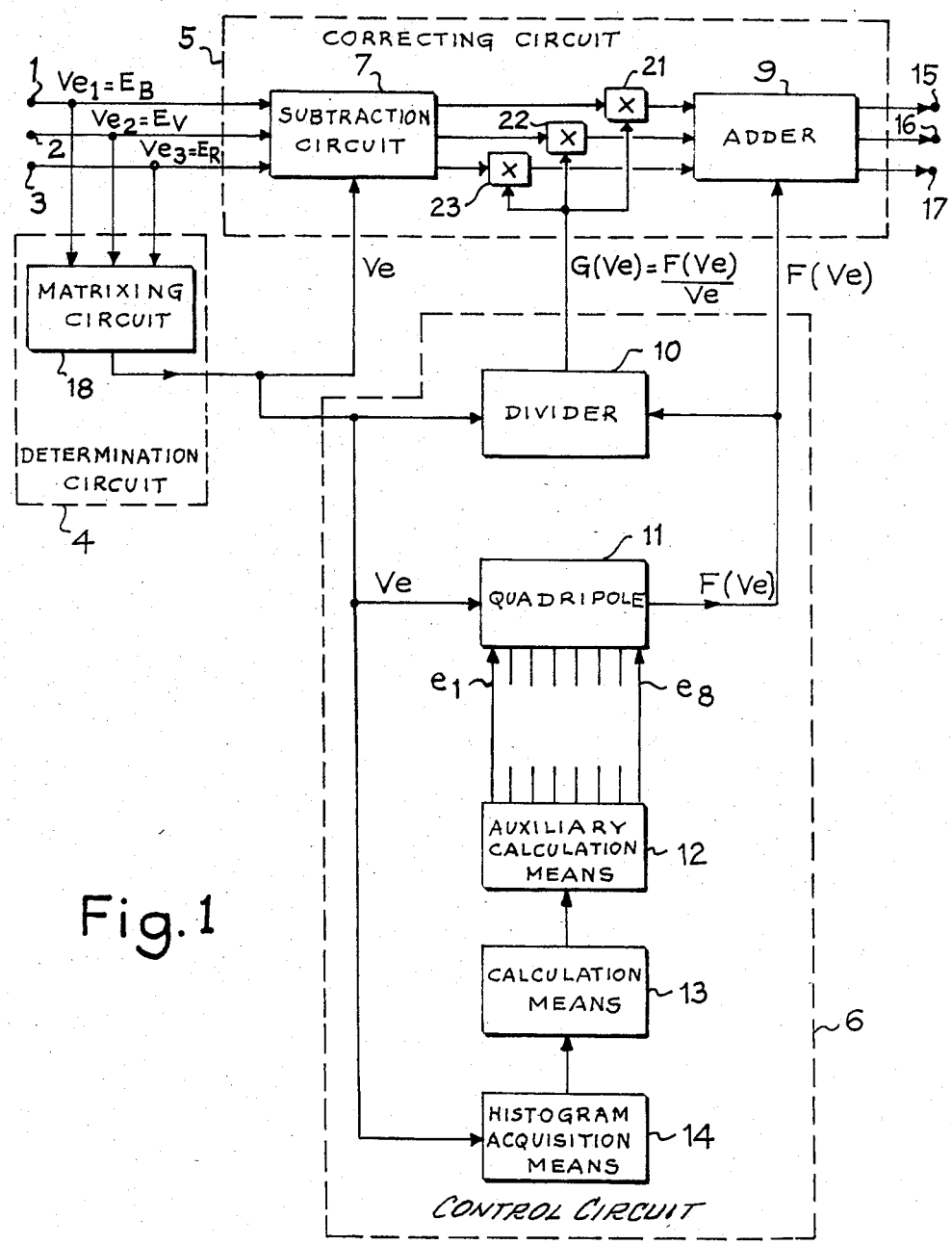
FIG. 1 is a first embodiment of the device according to the invention.

FIG. 1 is a block diagram of the first embodiment of the device according to the invention utilizing this process. FIG. 1 shows the three input terminals 1, 2 and 3 for respectively receiving the three colour signals $V_{e1}$, $V_{e2}$ and $V_{e3}$ supplied by the pickup tubes of a colour camera. These three inputs are respectively coupled to the three inputs of a circuit 4 for the determination of a signal $V_e$, constituted by a matrixing circuit 18. The output of matrixing circuit 18 supplies signal $V_e$ which, in this embodiment, comprises the overall luminance signal. This signal is deduced from the colour signals $V_{e1}$, $V_{e2}$ and $V_{e3}$ in accordance with the following formula: $V_e = 0.11 \cdot V_{e1} + 0.59 \cdot V_{e2} + 0.3 \cdot V_{e3}$. ($V_{e1}$, $V_{e2}$ and $V_{e3}$ corresponding respectively to the blue, green and red colour signals).

The output of matrixing circuit 18 is connected to one input of a control circuit 6. Control circuit 6 comprises the acquisition means 14 of a histogram, an analog quadripole 11 and an analog divider 10, each having an input connected to the input of control circuit 6, while it also comprises calculation means 13 and auxiliary calculation means 12. Quadripole 11 is non-linear and has variable characteristics regulatable by eight control inputs $e_1$ to $e_8$ for receiving eight signals defining the transfer parameters of the quadripole. Quadripole 11 is of the known type having a broken line transfer function constituted by a predetermined number of linear segments. In the present embodiment, quadripole 11 has been chosen with eight variable transfer parameters and specifically four pairs, constituted by a threshold value and a gain value defining four segments. Such a quadripole comprises four, not shown, amplifiers having a regulatable threshold below which each signal is not transmitted and above which the signals are transmitted with a fixed gain. Thus, quadripole 11 supplies a corrected luminance signal $F(V_e)$, F being the transfer function of the quadripole. This signal $F(V_e)$, corresponds to the sum of the four output signals of the four amplifiers of the quadripole and is supplied to a second input of the divider 10 and to a second output of control circuit 6.

Means 14 statistically analyze the amplitude distribution of 4000 samples of luminance signals $V_e$ in accordance with 64 given amplitude levels. The 4000 samples result from the analysis of 4000 ranges all covering a frame, and the 64 amplitude levels are distributed at regular intervals over the entire scale of the amplitudes of the luminance. Thus, means 14 make it possible to acquire the function representative of the histogram of the luminance (number of samples for each of the envisaged 64 levels).

The calculation means 13, whose input is connected to the output of means 14, calculates the integral of this function which, by definition, is the cumulative distribution function of the amplitude levels of the samples.

On the basis of the cumulative distribution function, the auxiliary calculating means 12, having an input connected to the output of means 13 and 8 outputs respectively connected to the 8 control inputs $e_1$ to $e_8$ of the quadripole 11, calculate the values of the 8 transfer parameters $A_1$ to $A_4$ and $G_1$ to $G_4$ to be applied to the control inputs $e_1$ to $e_8$, $A_i$ and $G_i$ (i varying from 1 to 4) respectively representing the threshold values and the gain values of the amplifiers of the quadripole. The calculated values are such that the transfer function F realised by quadripole 11 is an approximation by segments of the cumulative distribution function calculated by means 13. The values of the thus determined parameters remain fixed throughout the duration of the following frame.

Such a transfer function transforms the luminance signal $V_e$ into a corrected signal $F(V_e)$ for which the distribution of the values permits a better vision, no matter what the shooting conditions. (In the present embodiment, the distribution corresponds to an equalization of the luminance histogram associated with the signal $F(V_e)$).

The assembly constituted by quadripole 11, the histogram acquisition means 14, the calculating means 13 and the auxiliary calculating means 12 exactly corresponds to the automatic control device described in detail in the aforementioned U.S. Patent application. The control circuit 6 also comprises the analog divider 10 having two inputs respectively receiving the signals of value $V_e$ and $F(V_e)$ and having an output, constituting the first output of the control circuit, and supplying a signal of value $G(V_e) = (F(V_e)/V_e)$.

The object of the invention is to correct the colour information $V_{e1}$, $V_{e2}$ and $V_{e3}$ in order that the overall luminance information, associated with the corrected colour informations, corresponds to the luminance information contained in signal $F(V_e)$, while retaining the original chromaticity of the analyzed picture. For this purpose, the three input terminals 1, 2 and 3 are respectively connected to the three first inputs of a correcting circuit 5, whose second, third and fourth inputs are respectively connected to the first input of the control circuit 6, to the output of the determination circuit 4 and to the second output of the control circuit 6. In the present embodiment, correcting circuit 5 comprises a subtraction circuit 7 having three first inputs constituting the three first inputs of correcting circuit 5 and three analog multipliers having three first inputs respectively connected to three outputs of the subtraction circuit 7, having three interconnected second inputs for forming the second input of correcting circuit 5 and having three outputs respectively connected to the three inputs of an adder 9. The subtraction circuit 7 has a second input constituting the third input of the correcting circuit 5. The adder 9 has a second input constituting the fourth input of the correcting circuit 5 and three outputs respectively constituting three outputs of correcting circuit 5, which are connected to the three output terminals 15, 16, 17 of the device according to the invention. The second and fourth inputs of correcting circuit 5 respectively receive a value $G(V_e) = (F(V_e)/V_e)$ supplied by the output of divider 10 and the value $F(V_e)$ supplied by the output of quadripole 11. Subtraction circuit 7 has three outputs respectively supplying three colour difference signals $DV_{e1}$, $DV_{e2}$ and $DV_{e3}$. These three signals are processed from signals $V_{e1}$, $V_{e2}$, $V_{e3}$ and $V_e$ in accordance with the following formulas:

$$DV_{e1} = V_{e1} - V_e$$

$$DV_{e2} = V_{e2} - V_e$$

$$DV_{e3} = V_{e3} - V_e$$

Multipliers 21, 22, 23 respectively process three signals $DV_{S1}$, $DV_{S2}$ and $DV_{S3}$ from signals $G(V_e)$, $DV_{e1}$, $DV_{e2}$ and $DV_{e3}$ in accordance with the following formulas:

$$DV_{S1} = DV_{e1} \cdot G(V_e)$$

$$DV_{S2} = DV_{e2} \cdot G(V_e)$$

$$DV_{S3} = DV_{e3} \cdot G(V_e)$$

The three outputs of adder 9 respectively supply three signals $V_{S1}$, $V_{S2}$ and $V_{S3}$ processed from signals $DV_{S1}$, $DV_{S2}$, $DV_{S3}$ and $F(V_e)$ in accordance with the following formulas:

$$V_{S1} = DV_{S1} + F(V_e)$$

$$V_{S2} = DV_{S2} + F(V_e)$$

$$V_{S3} = DV_{S3} + F(V_e)$$

In accordance with the principle described hereinbefore, correcting circuit 5 transforms the colour informations $V_{e1}$, $V_{e2}$ and $V_{e3}$ associated with the overall luminance signal $V_e$ into corrected colour signals $V_{S1}$, $V_{S2}$ and $V_{S3}$ associated with the corrected overall luminance signal $F(V_e)$. Thus, only the overall luminance has been corrected. The original chromaticity of the analysed picture is not affected by the correction made by correcting circuit 5.

The invention is not limited to the described and represented embodiment and numerous variants are possible thereto. In particular, quadripole 11 can have a random number of variable parameters in order to better adapt the transfer function to the cumulative distribution function. The same applies with regards to the number of samples and the number of amplitude levels of the luminance signal.

Reference has been made in exemplified manner to equalizing the histogram, but any other distribution could be envisaged, whereby this would lead to the calculation of a transfer function differing from the cumulative distribution function.

It should be noted that the control circuit 6 or one of its elements can easily be constructed by means of a microprocessor.

It should also be noted that the overall operation performed on the signals $V_{e1}$, $V_{e2}$ and $V_{e3}$ by correcting circuit 5 consists of multiplying each of the three signals by signal $G(V_e)$. Thus, it is easy to prove that:

$$V_{S1} = G(V_e) \cdot V_{e1}$$

$$V_{S2} = G(V_e) \cdot V_{e2}$$

$$V_{S3} = G(V_e) \cdot V_{e3}$$

It is therefore possible to construct correcting circuit 5 in a manner different from that described hereinbefore by eliminating the subtraction circuit 7 and adder 9. The embodiment described hereinbefore and shown in FIG. 1 is more complex, but it makes it possible to easily obtain the pass band width required for the luminance signal.

It is also possible to directly generate the signal $G(V_e)$ by means of a digital memory. The analog signal of value $V_e$ is then converted into digital values, which are applied to the address inputs of a memory in which a microprocessor has previously stored the values of $G(V_e)$. The output of the memory is then connected to the input of a digital-analog converter, which supplies the signal $G(V_e)$.

In the described embodiment, the matrixing circuit 4 processes a signal $V_e$ corresponding to the overall luminance signal calculated with the standard coefficients (0.11; 0.59; 0.3). However, the invention is also applicable on the basis of a signal $V_e$ corresponding to a different combination of the colour informations. For example, excellent results have been obtained by taking as signal $V_e$ the signal corresponding to max. ($V_{e1}$; $V_{e2}$; $V_{e3}$). Finally, it should be noted that the invention can easily be applied on the basis of three colour signals of value $E_Y$, $D_R$ and $D_B$ transmitted in colour television. Thus, the treatment which is to be undergone by these three signals can be easily deduced from that described for the three primary signals $E_B$, $E_V$ and $E_R$, these two triplets of signals being linked by linear relationships.

Figure 2:
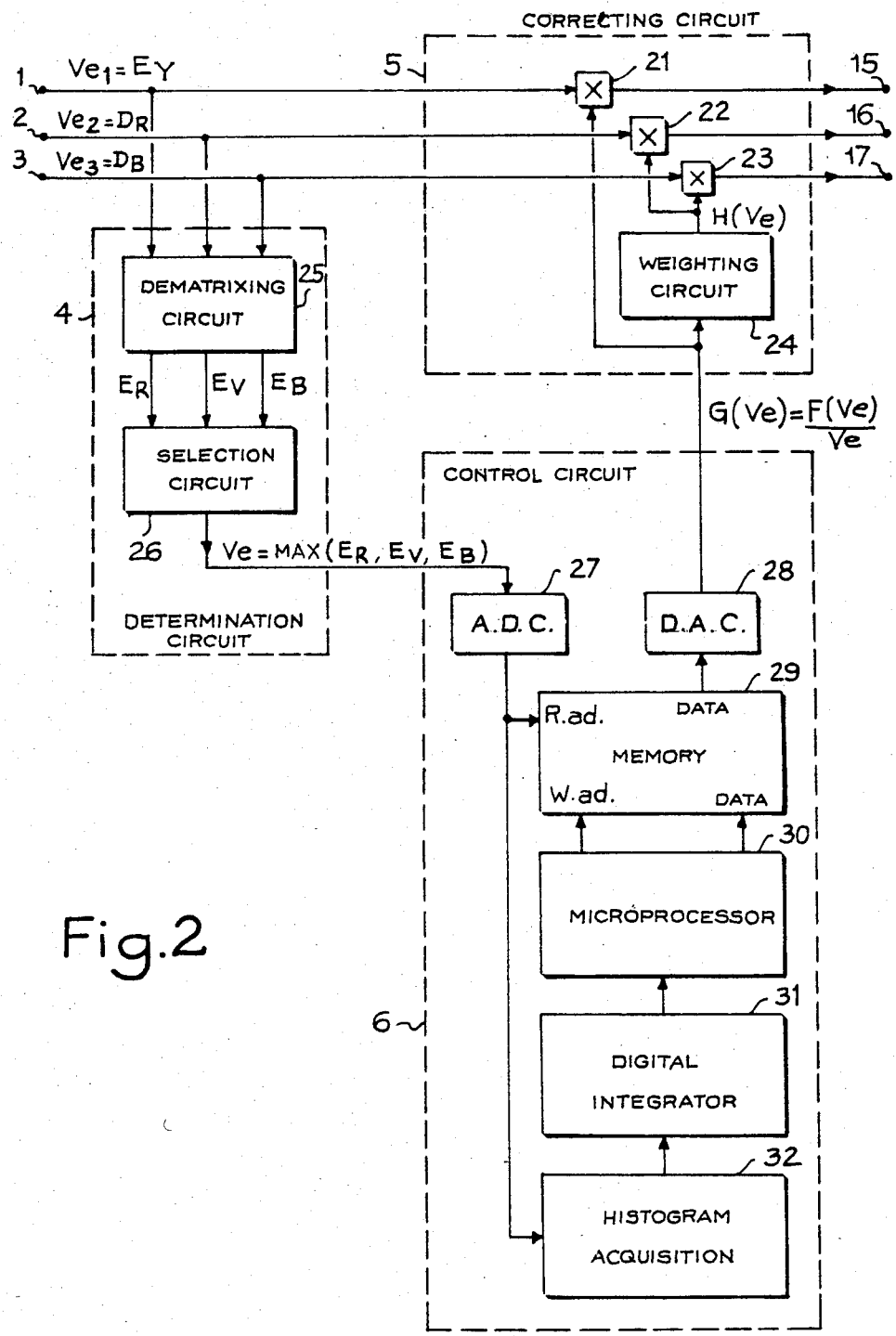
FIG. 2 is a second embodiment of the device according to the invention.

FIG. 2 shows a second embodiment of the device according to the invention. In this embodiment, the determination circuit 4 supplies a signal of value $V_e$, which is not equal to the overall luminance value, but which is equal to the highest of the values among the three colour signals $E_R$, $E_V$ and $E_B$ at the considered sampling time:

$$V_e = \text{Max}(E_R, E_V, E_B).$$

Furthermore, the correction consists of correcting the overall luminance, while retaining the original chromaticity of the picture when the value $G(V_e)$ is high, but not when it is low. In the first case, the corrected luminance value is above the original value and the device does not modify the colour saturation. In the second case, the corrected luminance value is below the original value and the perception of the picture is improved by increasing the colour saturation, whilst retaining the said shade. The signals of values $V_{e1}$, $V_{e2}$ and $V_{e3}$ are constituted by the overall luminance signal of value $E_Y$ and the colour difference signals of values $D_R$ and $D_B$. The control circuit 6 processes the value $G(V_e)$ using a digital process evolved by a microprocessor.

In this embodiment, a determination circuit 4 is constituted by a dematrixing circuit 25 having three inputs constituting the three inputs of the determination circuit 4 and three outputs supplying colour signals of values $E_R$, $E_V$ and $E_B$ to three inputs of a selection circuit 26, which determines which of these values is the highest and dispatches the latter to an output constituting the output of the determination circuit 4. The thus determined value $V_e$ is applied to an input of control circuit 6.

Control circuit 6 comprises an analog-digital converter 27, whose input forms the input of control circuit 6 and which converts the value $V_e$ from analog into digital form. Control circuit 6 comprises a digital-analog converter 28, whose output forms an output of the control circuit 6 and supplies a signal of value $G(V_e)$ in analog form. Control circuit 6 also has histogram acquisition means 42, a digital integrator 31, a microprocessor 30 and a random access memory 29. Means 32 calculate for each field of a picture, the histogram of 4000 values $V_e$ supplied by the output of the analog-digital converter 27 and supply the values of said histogram to digital integrator 31, which calculates the values of the cumulative distribution function of said histogram and supplies them to an input of microprocessor 30. Microprocessor 30 has two outputs respectively connected to a writing address input and to a data input of memory 29. It calculates a table of the values of function $G(V_e)$ and stores this table in memory 29. This calculation is performed in two stages, namely the first stage consisting in determining a function F such that the histogram of the values of the corrected signal $F(V_e)$ has a predetermined distribution over its entire scale of values. For example, to have a regular distribution, it is merely necessary for function $F(V_e)$ to be equal to the cumulative distribution function of values $V_e$. In a second stage, microprocessor 30 calculates the values of function $G(V_e) = (F(V_e))/V_e$ while taking account of a limitation of the value $G(V_e)$ to 4, in the present embodiment, in order to never subject the picture to a colour defect and in order not to amplify the noise to the extent of making it visible. In this embodiment, microprocessor 30 calculates 64 values of $G(V_e)$, each of these values being chosen from among 256 possible values coded on 8 bits. These values are stored in memory 29, which has 256 octets. This memory has a reading address input connected to the output of the analog-digital converter 27 and a data output connected to the input of the digital-analog converter 28. For each point of a picture, the output of the determination circuit 4 supplies a value $V_e$, which is transmitted in digital form to the reading address input of memory 29. The latter supplies at its data output a digital value $G(V_e)$, which is converted into analog form by digital-analog converter 28 and which is applied to the output of control circuit 6.

Correcting circuit 5 has three analog multipliers 21, 22, 23 having three first inputs and three outputs respectively constituting three first inputs and three outputs of correcting circuit 5, and having three second inputs. The second input of multiplier 21 is connected to a second input of correcting circuit 5 and the second inputs of multipliers 22 and 23 are together connected to the output of a weighting circuit 24 having an input connected to a second input of correcting circuit 5.

The weighting circuit 24 is an analog circuit supplying at its output a signal of value $H(V_e)$ equal to 1 when $G(V_e)$ is equal to or below 1, and a signal of value $H(V_e)$ equal to $G(V_e)$, when the latter is higher than 1. The value $G(V_e)$ is transmitted without modification when it is high, so that the chromaticity is retained when the correction consists in increasing the luminance of a shade, whilst the saturation of colour is increased when the luminance of a shade is decreased.

It falls within the scope of the Expert to produce a differently operating weighting circuit 24 and, in particular, it is possible to use a weighting circuit supplying a value such that:

$$H(V_e) = \tfrac{1}{2}\, G(V_e) + \tfrac{1}{2}.$$

In this case, the colour saturation is increased when the overall luminance is decreased and the colour saturation is decreased when the overall luminance is increased.

It falls within the scope of the Expert to differently construct the determination circuit 4 and to take for value $V_e$ a different combination of the colour signals. On taking $V_e = \mathrm{Max}(E_R, E_V, E_B)$ makes it possible to prevent an exaggerated correction of the luminance signal, when one of the values of the colour signals is much higher than the two others.

What is claimed is:

1. A device for correcting color information signals of values $V_{e1}$, $V_{e2}$ and $V_{e3}$ supplied by a television camera, comprising:
   a determination circuit having three inputs respectively receiving the three color information signals and an output, for supplying a signal of value $V_e$ which is a function of the values of the color information signals;
   a control circuit having an input coupled to the output of the determination circuit and having an output for supplying a signal of value $G(V)_e = (F(V_e)/V_e)$, in which F is a function such that its histogram has a predetermined distribution chosen for improving the perception of images; and
   a correction circuit comprising a first, a second, and a third multiplier, each having a first and a second input, and an output, said multipliers first inputs being respectively coupled to three first inputs of the correction circuit receiving the three color information signals, said multipliers second inputs being coupled to a second input of the correcting circuit receiving the value $G(V_e)$, and said multipliers three outputs being respectively coupled to three outputs of the correcting circuit for supplying three corrected color information signals.

2. A device according to claim 1 in which the color information signals are the red, green and blue color signals; in which the second inputs of the multipliers are connected to the second input of the correction circuit; in which the control circuit also comprises a second output supplying a signal of value $F(V_e)$; and in which the correction circuit also comprises:
   a third input connected to the output of the determination circuit,
   a fourth circuit connected to the second output of the control circuit,
   a subtraction circuit having three first inputs respectively connected to the three first inputs of the correction circuit, a second input connected to the third input of the correction circuit and three outputs respectively connected to the three first inputs of the multipliers for respectively supplying values $V_{e1} - V_e$, $V_{e2} - V_e$, $V_{e3} - V_e$;
   an addition circuit having three first inputs respectively connected to the three outputs of the multipliers, a second input connected to the fourth input of the correction circuit and three outputs respectively connected to the three outputs of the correction circuit for respectively supplying the values $D\,V_{S1} + F(V_e)$, $D\,V_{S2} + F(V_e)$, $D\,V_{S3} + F(V_e)$, in which $D\,V_{S1}$, $D\,V_{S2}$, $D\,V_{S3}$ are values respectively supplied by the outputs of the three multipliers.

3. A device according to claim 1 in which the color information signals are constituted by the overall luminance signal and two color difference signals and are respectively applied to the first inputs of the first, the second and the third multipliers; in which the correction circuit also comprises a weighting circuit having an input connected to the second input of the correcting circuit and having an output; in which the second input of the first multiplier is connected to the second input of the correcting circuit; and wherein the second inputs of the second and third multiplier are connected to the output of the weighting circuit, the weighting circuit multiplying the value $G(V_e)$ by a coefficient which varies as a function of the value $G(V_e)$.

4. A device according to claim 1 in which the control device comprises:
   a non-linear quadripole with variable characteristics, having a control input making it possible to regulate its transfer function, an input connected to the input of the control circuit and having an output for supplying a signal of value $F(V_e)$;
   a divider having a first input connected to the input of the control device, a second input connected to the output of the quadripole and an output connected to the first output of the control device for supplying the signal of value $G(V_e) = (F(V_e)/V_e)$; and
   means for determining the histogram of values $V_e$ and then the cumulative distribution function of these values and for deducing therefrom values of parameters defining the function F such that the histogram of the values $F(V_e)$ as a function of the values $V_e$ has a predetermined distribution, said determining means having an input connected to the input of the control circuit and having an output connected to the control input of the quadripole.

5. A device according to claim 1 in which the control circuit comprises:
   means for determining the histogram of values $V_e$ and then the cumulative distribution function of these values and for deducing therefrom the values of the function $F(V_e)$, such that its histogram as a function of the values $V_e$ has predetermined distribution, said determining means having an input coupled to the input of the control circuit and an output;
   a microprocessor having an input connected to the output of said determining means and having a data output and an address output, for calculating the values of $(F(V_e)/V_e)$; and
   a random access memory for storing the values of $(F(V_e)/V_e)$, having a writing address input connected to the address output of the microprocessor, a data input connected to the data output of the microprocessor and a reading address input coupled to the input of the control circuit and having a data output coupled to the output of the control circuit.

6. A device according to claim 1 wherein the determination circuit comprises means for selecting, among color signals red, green and blue, the color signal having the highest value at each sampling time.

7. A device according to claim 1 wherein the determination circuit comprises means for determining a luminance value from the three color information signals.

8. A device according to claim 1 in which the signal of value $V_c$ is constituted by the colour information signal having the highest value at the considered sampling time.

* * * * *